United States Patent Office 2,852,411
Patented Sept. 16, 1958

2,852,411

PROCESS FOR FORMING SOLID ALUMINUM DIACYLATES AND COATING THEREWITH

Jacobus Rinse, Bernardsville, N. J., assignor to J. W. Ayers & Co., Easton, Pa., a corporation of Delaware No Drawing. Application August 8, 1955
Serial No. 527,137

12 Claims. (Cl. 117—65)

This invention relates to the reaction of true aluminum triacylates with hydroxyl compounds for the production of solid aluminum diacylates having various utilities, as gelling and hardening agents for greases, oils, and other single or mixed hydrocarbons, and for paints and other coating compositions having water-repellent characteristics.

Hydroxy aluminum diacylates and alkoxy aluminum diacylates, especially those containing higher molecular alkoxy groups, are very stable and may be used to advantage in various industrial processes and products.

An object of the present invention is to increase their usefulness and to extend their field of utility by providing a process of forming the diacylates in situ whereby such compounds become more minutely and effectively dispersed in the vehicle or composition of which they are to be a part or whereby products containing such compounds are obtained in a new state or condition or with new and improved properties.

In the reaction of the invention, one of the acylate radicals of the aluminum triacylate is replaced by the positive radical of the organic hydroxyl compound in a double decomposition reaction in accordance with the formula:

$$AlX_3 + Y-OH \rightarrow YO-Al(X)_2 + HX$$

or,

$$2AlX_3 + HO-Y-OH \rightarrow X_2Al-O-Y-O-AlX_2 + 2HX$$

wherein X signifies any of the acylate radicals herein described and Y signifies any of the organic positive radicals of the hydroxyl compounds herein described (such radicals being polyvalent in the second formula).

The aluminum triacylate reactant used in the process of the present invention is defined as a "true" aluminum triacylate to distinguish the same from the so-called aluminum tri-soaps sold to the trade which are in fact not tri-soaps or triacylates but instead are mixtures of hydroxy di-soaps and free acid. The preparation of true aluminum triacylates is described in the co-pending applications Serial No. 489,777, filed February 21, 1955, and Serial No. 495,061, filed March 17, 1955, by Jacobus Rinse of which this application is a continuation-in-part.

The true aluminum triacylates can be distinguished from the corresponding so-called aluminum tri-soaps of commerce by their differences in properties, namely—the true compounds dissolve readily in mineral spirits or other anhydrous solvents without producing a high viscosity and they have sharp melting points (aluminum tristearate has a melting point of approximately 90° C.) In contrast thereto the aluminum tri-soaps of commerce dissolve in hydrocarbons and yield very viscous solutions or gels even at low concentrations of 3–10%, or in some cases even at lower concentrations and they do not possess sharp melting points. The gelling qualities of these soaps, particularly so-called aluminum tristearate and the so-called triethyl hexoate are used extensively for the production of oils, greases and other products.

The preferred true aluminum triacylate reactants used in the present invention are derived from fatty acids of unsaturated type of higher molecular weight, as oleic, linoleic and linolenic and even substituted acids, of which ricinoleic acid and monoesters of dicarboxylic acids are examples. However, the triacylates may be derived from fatty acids of saturated character, such as stearic acid and ethyl hexoic acid. The carbon chain may be of any configuration, aliphatic or aromatic and may be of any length from one carbon atom up.

When liquid coating compositions containing triacylates of the higher molecular unsaturated fatty acids, examples of which have hereinbefore been described, are applied in film form, rapid drying of the film occurs due to reaction with the moisture in the atmosphere. Since the hydroxy aluminum diacylates formed are solids, the liquid film forms a solid coating. By the addition of common driers as those containing lead, cobalt and manganese to the coating compositions containing such triacylates, the film is caused to dry and harden not only by hydrolysis but also by oxidation and polymerization by action involving the double bond. Such coatings have much better water resistance than regular coatings from unsaturated oils.

Mixed acylates of aluminum may be used to advantage, particularly where a diacylate of a specific acid is desired but the presence of the liberated mol of the same acid is objectionable in the reaction mass. If this is the case, the acylate selected is one having two acylate radicals of the desired acid or acids and one acrylate radical of a different acid of a type which is not objectionable in the reaction mass or possesses physical characteristics different from those of the reaction mass as differences in solubility or in physical state, i. e. solid vs. liquid or liquid vs. solid. Examples are mixed acylates of low and high molecular weight fatty acids and of aliphatic with aromatic acids.

In another embodiment the aluminum triacylate is derived from rosin acids such as abietic acid. In still another embodiment the triacylates are esterified radicals, as for example, $Al(OOCR^1COOR^2)_3$ which can be prepared from aluminum alkoxides and dicarboxylic anhydrides, for example phthalic anhydride or maleic anhydride.

The second reactant used in the present invention is referred to as a "hydroxyl compound" for the reaction will occur with alcohols, phenols and water as well as with any compounds containing alcoholic or phenolic hydroxyl groups. The organic hydroxyl compounds may have any number of carbon atoms and be of any configuration. Both monohydric and polyhydric alcohols may be employed. Not only the simple phenols may be used, but also bisphenols and substituted phenols, as the cresols. In a special embodiment, the hydroxyl compound used is cellulose. In another, it is alkyd resins containing free hydroxy groups and in a third embodiment it is a hydroxy, alkoxy acylate of aluminum, examples of which are disclosed in applicant's copending application Serial No. 495,765, filed March 21, 1955.

Although, with many combinations of reactants, the reaction will proceed merely by mixing the ingredients together at normal temperature, some reactions will be facilitated by or require the application of heat. The reaction may also be facilitated in some instances by reacting in solution or first dissolving one or another of the components in an organic solvent such as mineral spirits or benzol.

The proportions of the reactants mixed together for reaction may be varied, but if unreacted components are not desired in the final product then equivalent quantities or mol to mol proportions of triacylate to each OH group should be used for this is the only ratio in which they will react.

Example 1

Aluminum trioleate, a liquid, in a quantity of 290 grams is mixed with 6 grams of water added thereto. Upon stirring at room temperature a solid, waxy substance which can be used as a gelling agent is obtained.

Example 2

Aluminum triabietate, a solid, in a quantity of 330 grams is dissolved in 600 grams of mineral spirits and mixed thoroughly with 6 grams of water. Upon heating to 100° C. reaction occurs quickly. Thereupon the solution solidifies completely. A thickening and flattening agent for paint is obtained.

Example 3

Thirty grams of aluminum tristearate is melted and after the addition of 5 grams of decanol the mass is heated to 130° C. The liquid thickens and decanoxy aluminum distearate is formed. This product is a wax-hardening agent.

Example 4

Twenty-nine grams of aluminum tristearate is heated with 3.6 grams of a cresol and heated to 120° C. A plastic mass is obtained consisting of cresoxy aluminum distearate and stearic acid. When this compound is dissolved in mineral oil, an oxidation-resistant grease is obtained.

Example 5

Aluminum triethyl hexoate in a quantity of 152 grams is dissolved in 150 grams of mineral spirits and mixed with 24 grams of ethylene glycol. Reaction and solidification occurs at 100° C., a stiff gel being formed having utility as an anti-settling agent.

Example 6

One hundred grams of a 24% phthalic soybean oil alkyd resin having free hydroxy groups, dissolved in 150 grams of mineral spirits, is mixed with 10 grams of aluminum trilinoleate. A low viscosity solution is obtained. On heating the same to 130° C. a soft gel is formed due to the reaction of the triacylate with the free hydroxy group of the alkyd resin. This gel constitutes a vehicle for gel paints.

Example 7

A sheet of filter paper is soaked with a 10% solution of aluminum tristearate in benzol and heated for a short time at 130° C. The paper becomes water-resistant and water-repellent. (A filter paper treated in similar manner with a solution of hydroxy aluminum distearate is not water-resistant.)

Example 8

Fifty parts of soy bean oil are mixed with 50 parts of aluminum tritungate and a small amount of conventional metal driers. When this composition is spread as a thin film it surface-dries very rapidly by exposure to the air. Moisture transforms the tritungate into the diacylate. Thorough drying occurs by oxidation and polymerization of the double bonds, as in common drying oils.

It should be understood that the present invention is not limited to the specific examples or conditions herein described but that it extends to all equivalents which will occur to those skilled in the art upon consideration of the terms used in the claims appended hereto.

I claim:

1. The process for forming solid Y-oxy diacylates of aluminum which comprises heating and reacting an organic hydroxyl compound with a true aluminum triacylate, Y being the positive radical of the organic hydroxyl compound.

2. The process for forming solid diacylates of aluminum which comprises reacting an hydroxy hydrocarbon with a hydrocarbon-soluble true aluminum triacylate by heating to a high temperature sufficient to and which does cause double decomposition involving replacement of one acylate radical by the oxy-hydrocarbon radical of the hydroxy hydrocarbon.

3. The process for forming solid diacylates of aluminum which comprises reacting an alcohol with a true aluminum triacylate at an elevated temperature which causes the positive radical of the alcohol to replace an acylate radical.

4. The process for forming solid diacylates of aluminum which comprises reacting a polyhydric alcohol with a true aluminum triacylate at a temperature above about 100° C.

5. The process for forming solid diacylates of aluminum which comprises reacting a glycol with a true aluminum triacylate at an elevated temperature which causes the positive radical of the glycol to replace an acylate radical.

6. The process for forming solid diacylates of aluminum which comprises reacting cellulose with a true aluminum triacylate by increasing the temperature to a level at which reaction occurs by double decomposition.

7. The process for forming solid diacylates of aluminum which comprises reacting an hydroxy, aluminum acylate with a true aluminum triacylate by increasing the temperature to a level at which reaction occurs by double decomposition.

8. The process for forming solid diacylates of aluminum which comprises reacting an hydroxy, alkoxy aluminum acylate with a true aluminum triacylate by increasing the temperature to a level at which reaction occurs by double decomposition.

9. A process for forming aluminum diacylates in finely dispersed condition in hydrocarbon solvents or other carrier which comprises reacting an organic hydroxyl compound with a true aluminum triacylate by a procedure involving dispersing one of said reactants in a liquid hydrocarbon or other carrier and mixing therewith the other reactant under high temperature conditions at which double decomposition occurs, whereby a stable organo-oxy diacylate of aluminum is formed in situ.

10. A process for forming solid aluminum diacylates in the form of coatings which comprises applying a true aluminum triacylate in liquid form on the surface to be coated, and reacting the acylate with an organic hydroxyl compound by raising the temperature to a high level at which the positive radical of the organic hydroxyl compound replaces an acylate radical.

11. A process for forming solid aluminum diacylates in the form of coatings which comprises applying a true aluminum triacylate of an unsaturated fatty acid of 18 carbon atoms in liquid form together with an aliphatic hydroxyl compound having at least 10 carbon atoms, on the surface to be coated, and heating and reacting the acylate at a high temperature with the hydroxyl compound thereby causing hardening of the coating both by a double decomposition reaction between the triacylate and the glycol and by oxidation and polymerization involving double bond reaction of the unsaturated fatty acid radicals present.

12. A process for forming solid alkoxy diacylates of aluminum which comprises mixing together an aliphatic alcohol with an aluminum triacylate in the approximate mol ratio of one of the triacylate to each hydroxy group of the alcohol, said acylate being a true acylate identifiable by the possession of a sharp melting point and a ready solubility in mineral spirits which provide solutions of low viscosity, heating the resulting mixture to a temperature above about 100° C. at which double decomposition occurs involving replacement of one of the acylate radicals by the positive radical of the aliphatic radical, thus producing the solid alkoxy diacylate of aluminum.

References Cited in the file of this patent

UNITED STATES PATENTS

| | | |
|---|---|---|
| 2,169,577 | Bradley | Aug. 15, 1939 |
| 2,321,463 | Condit | June 8, 1943 |
| 2,582,833 | Hunn | Jan. 15, 1952 |
| 2,630,445 | Delaune | Mar. 3, 1953 |
| 2,643,228 | Bond | June 23, 1953 |